(12) United States Patent
Leighton et al.

(10) Patent No.: US 8,972,608 B2
(45) Date of Patent: Mar. 3, 2015

(54) USER-SELECTABLE IEEE 1588 CLOCK CLASS AND QUALITY LEVEL MAPPING

(75) Inventors: Ian Leighton, Ottawa (CA); Matthew Simone, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 154 days.

(21) Appl. No.: 13/537,300

(22) Filed: Jun. 29, 2012

(65) Prior Publication Data

US 2014/0006595 A1    Jan. 2, 2014

(51) Int. Cl.
  *G06F 15/16*    (2006.01)
(52) U.S. Cl.
  USPC ........................................................ 709/248
(58) Field of Classification Search
  CPC ..... H04J 3/0667; H04J 3/0641; H04J 3/0647; G06F 1/12
  USPC ........................................................ 709/248
  See application file for complete search history.

(56) References Cited

U.S. PATENT DOCUMENTS

| 8,094,687 | B2  |   | 1/2012 | Cheng et al. |         |
|-----------|-----|---|--------|--------------|---------|
| 2009/0207863 | A1 | * | 8/2009 | Cheng et al. ................... | 370/498 |
| 2010/0228837 | A1 | * | 9/2010 | Squire et al. ................... | 709/220 |
| 2011/0158120 | A1 | * | 6/2011 | Hamasaki et al. ............ | 370/252 |
| 2011/0200051 | A1 | * | 8/2011 | Rivaud et al. ................. | 370/400 |
| 2012/0008514 | A1 | * | 1/2012 | Ponnuswamy ............... | 370/252 |
| 2013/0227172 | A1 | * | 8/2013 | Zheng et al. .................. | 709/248 |

FOREIGN PATENT DOCUMENTS

EP    2 071 760 A1    6/2009

OTHER PUBLICATIONS

ITU-T Rec. G.8265.1. [ > database online], [retrieved on Jan. 21, 2014]. Retrieved from the Internet <URL:*> http://handle.itu.int/11.1002/1000/10911-en?locatt=format:pdf <.*
ITU-T Rec. G.8265.1. [ > database online], [retrieved on Jan. 21, 2014]. Retrieved from the Internet < URL: *> http://handle.itu.int/11.1002/1000/10911-en?locatt=format:pdf <.*
Rodrigues, Silvana et al., "IEEE-1588 Profiles", Nov. 3-5, 2009, www.chronos.co.uk [online], [retrieved on Aug. 4, 2014]. Retrieved from the Internet < URL: *> http://www.chronos.co.uk/files/pdfs/itsf/2009/Day1/IDT%20IEEE-1588%20Profiles.pdf<.*
Notification of Transmittal of the International Search Report and the Written Opinion of the International Searching Authority, or the Declaration in International Appl. No. PCT/CA2013/050497 mailed Oct. 21, 2013 (8 pages).

* cited by examiner

*Primary Examiner* — Brian J Gillis
*Assistant Examiner* — Austin Moreau
(74) *Attorney, Agent, or Firm* — Kramer Amado, P.C.

(57) ABSTRACT

Various exemplary embodiments relate to a method performed by a first network element, the method including: receiving first user inputs for mapping IEEE 1588 clock class into ITU-T G.781 quality levels; producing a first table that maps clock class to quality level; providing the first table to a second network element; receiving second user inputs for mapping ITU-T G.781 quality level into IEEE 1588 clock class; producing a second table that maps quality level to clock class; and providing the second table to the second network element.

20 Claims, 4 Drawing Sheets

| Quality Level to Clock Class Mapping Table | | |
|---|---|---|
| Index | ITU-T G.781 Quality Level | IEEE 1558 Clock Class |
| 0 | QL-UNK | class 82 |
| 1 | QL-PRS | class 80 |
| 2 | QL-STU | class 82 |
| 3 | QL-ST2 | class 86 |
| 4 | QL-TNC | class 90 |
| 5 | QL-ST3E | class 100 |
| 6 | QL-ST3 | class 102 |
| 7 | QL-SMC | class 106 |
| 8 | QL-ST4 | class 110 |
| 9 | QL-DUS | class 110 |
| 10 | QL-PRC | class 84 |
| 11 | QL-SSU-A | class 90 |
| 12 | QL-SSU-B | class 96 |
| 13 | QL-SEC | class 104 |
| 14 | QL-DNU | class 110 |
| 15 | QL-INV | class 110 |
| 16 | QL-PNO | class 108 |
| 17 | QL-EEC1 | class 104 |
| 18 | QL-EEC2 | class 102 |
| 19 | QL-FAILED | class 110 |

*FIG. 1*

| Clock Class to Quality Level Mapping Table | | | | | | | | |
|---|---|---|---|---|---|---|---|---|
| Class | 0 | 1 | 2 | 3 | 4 | 5 | 6 | 7 |
| 0 - 7 | 19 | 19 | 19 | 19 | 19 | 19 | 1 | 2 |
| 8 - 15 | 19 | 19 | 19 | 19 | 19 | 1 | 2 | 19 |
| 16 - 23 | 19 | 19 | 19 | 19 | 19 | 19 | 19 | 19 |
| 24 - 31 | 19 | 19 | 19 | 19 | 19 | 19 | 19 | 19 |
| 32 - 39 | 19 | 19 | 19 | 19 | 19 | 19 | 19 | 19 |
| 40 - 47 | 19 | 19 | 19 | 19 | 19 | 19 | 19 | 19 |
| 48 - 55 | 19 | 19 | 19 | 19 | 19 | 19 | 19 | 19 |
| 56 - 63 | 19 | 19 | 19 | 19 | 19 | 19 | 19 | 19 |
| 64 - 71 | 19 | 19 | 19 | 19 | 19 | 19 | 19 | 19 |
| 72 - 79 | 19 | 19 | 19 | 19 | 19 | 19 | 19 | 19 |
| 80 - 87 | 1 | 19 | 2 | 19 | 10 | 19 | 3 | 19 |
| 88 - 95 | 19 | 19 | 4 | 19 | 19 | 19 | 19 | 19 |
| 96 - 103 | 12 | 19 | 19 | 19 | 5 | 19 | 6 | 19 |
| 104 - 111 | 13 | 19 | 7 | 19 | 16 | 19 | 9 | 19 |
| 112 - 119 | 19 | 19 | 19 | 19 | 19 | 19 | 19 | 19 |
| 120 - 127 | 19 | 19 | 19 | 19 | 19 | 19 | 19 | 19 |
| 128 - 135 | 19 | 19 | 19 | 19 | 19 | 19 | 19 | 19 |
| 136 - 143 | 19 | 19 | 19 | 19 | 19 | 19 | 19 | 19 |
| 144 - 151 | 19 | 19 | 19 | 19 | 19 | 19 | 19 | 19 |
| 152 - 159 | 19 | 19 | 19 | 19 | 19 | 19 | 19 | 19 |
| 160 - 167 | 19 | 19 | 19 | 19 | 19 | 19 | 19 | 19 |
| 168 - 175 | 19 | 19 | 19 | 19 | 19 | 19 | 19 | 19 |
| 176 - 183 | 19 | 19 | 19 | 19 | 19 | 19 | 19 | 19 |
| 184 - 191 | 19 | 19 | 19 | 19 | 19 | 19 | 19 | 19 |
| 192 - 199 | 19 | 19 | 19 | 19 | 19 | 19 | 19 | 19 |
| 200 - 207 | 19 | 19 | 19 | 19 | 19 | 19 | 19 | 19 |
| 208 - 215 | 19 | 19 | 19 | 19 | 19 | 19 | 19 | 19 |
| 216 - 223 | 19 | 19 | 19 | 19 | 19 | 19 | 19 | 19 |
| 224 - 231 | 19 | 19 | 19 | 19 | 19 | 19 | 19 | 19 |
| 232 - 239 | 19 | 19 | 19 | 19 | 19 | 19 | 19 | 19 |
| 240 - 247 | 19 | 19 | 19 | 19 | 19 | 19 | 19 | 19 |
| 248 - 255 | 19 | 19 | 19 | 19 | 19 | 19 | 19 | 19 |

USER-SELECTABLE IEEE 1588 CLOCK CLASS AND QUALITY LEVEL MAPPING

TECHNICAL FIELD

Various exemplary embodiments disclosed herein relate generally to user-selectable IEEE 1588 clock class and quality level mapping.

BACKGROUND

Digital communication networks today need to be interoperable. Various equipment and networks may use different types of timing protocols to provide timing in the network. When different timing protocols are used in or between networks, it may be necessary to map the timing quality levels between the protocols. Two widely used timing protocols are ITU-T G.781 and IEEE 1588.

The ITU-T G.781 specification specifies a library of basic synchronization distribution building blocks and a set of rules by which they are combined in order to describe a digital transmission equipment's synchronization functionality. The ITU-T G.781 specifies clock quality levels. The IEEE 1588 protocol is a protocol used to synchronize clocks throughout a computer network. On a local area network it achieves high levels of clock accuracy, making it suitable for measurement and control systems. The IEEE 1588 specification defines a clock quality 3-tuple, of which one of the fields is clock class. This clock class has a range of values of [0 . . . 255], and the values may be assigned to various clock traceabilities relative to a primary reference. The IEEE1588 standard leaves many of the clock class values as "reserved" or "profile specific".

The ITU-T G.8265.1 specification redefines some of the reserved clock class values to map to ITU-T G.781 quality levels. Other specifications may further define or redefine the clock class values to suit specific needs of an industry or product using the IEEE 1588 protocol for time and/or frequency recovery. A IEEE 1588 clock vendor would have to design the clock to work with specific clock class definitions and may not be compatible with clocks using other definitions. Furthermore, when relating IEEE 1588 clock class values to ITU-T G.781 quality levels, different specifications may use different mappings and mappings may conflict from standard to standard. Finally, there may be different meanings for the quality level to clock class mappings in each direction, that is, which clock class is transmitted based on a received quality level and which quality level is transmitted based on a received clock class. These mappings may become complicated and vary between IEEE 1588 profiles and standards. It may become complicated for vendors to design a IEEE 1588 clock to conform to multiple profiles and for users to select the proper profile based on their deployment.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a first network element, the method including: receiving first user inputs for mapping IEEE 1588 clock class into ITU-T G.781 quality levels; producing a first table that maps clock class to quality level; providing the first table to a second network element; receiving second user inputs for mapping ITU-T G.781 quality level into IEEE 1588 clock class; producing a second table that maps quality level to clock class; and providing the second table to the second network element.

Various exemplary embodiments relate to a non-transitory machine-readable storage medium encoded with instructions for execution by first network element, the medium including: instructions for receiving first user inputs for mapping IEEE 1588 clock class into ITU-T G.781 quality levels; instructions for producing a first table that maps clock class to quality level; instructions for providing the first table to a second network element; instructions for receiving second user inputs for mapping ITU-T G.781 quality level into IEEE 1588 clock class; instructions for producing a second table that maps quality level to clock class; and instructions for providing the second table to the second network element.

BRIEF DESCRIPTION OF THE DRAWINGS

In order to better understand various exemplary embodiments, reference is made to the accompanying drawings, wherein:

FIG. 1 illustrates a quality level to clock class mapping table;

FIG. 2 illustrates a clock class to quality level mapping table;

To facilitate understanding, identical reference numerals have been used to designate elements having substantially the same or similar structure and/or substantially the same or similar function.

DETAILED DESCRIPTION

Figure 3:
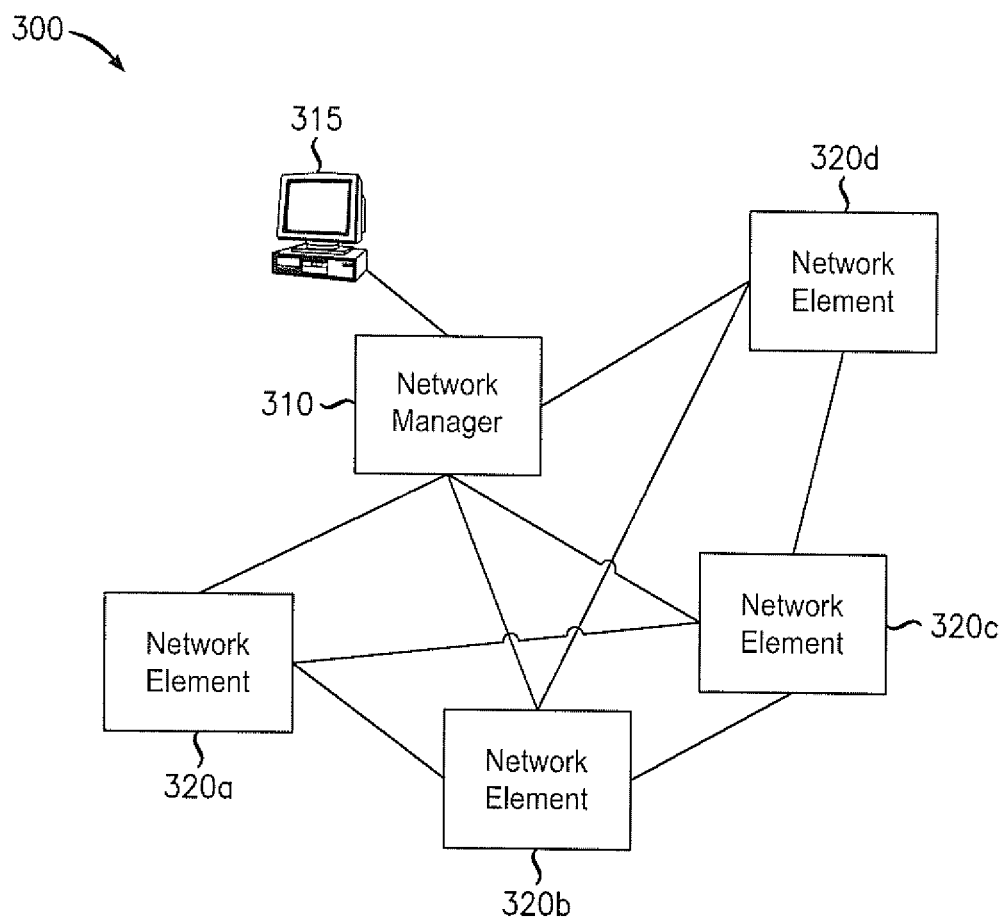
FIG. 3 illustrates a network and network manager that produces and uses the mapping tables.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

In identifying the problems above with respect to mapping between the clock class and quality level, it is desirable that the user should be given a simple way to design their own quality level to clock class and clock class to quality level definitions via a manager which may be centralized, for example, in a network management device. Such a solution may allow the user to have complete control of the IEEE 1588 clock class to quality level translation as well as the quality level to clock class translation via a network manager. Further, the network manager may distribute the customized mappings to any network element being managed. The distribution of the customized mappings may overwrite the custom or default mappings as a starting point to the customization by the user. Finally, the network manager may allow the user to set the mappings to some default values.

For example, the IEEE 1588 protocol may be a source of system synchronization for a network element in which the IEEE 1588 protocol clock resides. The IEEE 1588 protocol clock may have a default profile setting that may include default quality level-clock class mapping(s). The user may override or customize the quality level-Clock Class mapping (s) via a centralized network manager. Alternatively, the user may also use a command line interface on each network element.

In this example, the network element may maintain two separate tables of mappings, which are downloaded to it from the network manager. The first table may translate the quality level of the active synchronization reference to the network element to an IEEE 1588 clock class for the purpose of transferring synchronization downstream, while the second table may translate the IEEE 1588 clock class being received from the clock's selected master to a quality level defined in ITU-T G.781. Examples of these tables will be discussed below.

The class to be transmitted by a IEEE 1588 clock may depend on the frequency source for the IEEE 1588 clock and may be tied to the central clock on the particular network element. The user may modify the table to transmit any IEEE 1588 clock class [0 . . . 255] based on the known quality level of the frequency source. Similarly, the quality level to be sent to the network element's central clock, once the IEEE 1588 embedded clock selects a master, may be based on the clock class received in IEEE 1588 ANNOUNCE messages received from a master element. Each individual quality level may be modified by the user to allow any clock class to map to any quality level.

FIG. 1 illustrates a quality level to clock class mapping table. The first column is an index. The second column shows the twenty different ITU-T G.781 quality levels as a mnemonic identifier for each quality level. The third column shows an example mapped IEEE 1588 clock class. Note that in this example each quality level maps into a single IEEE 1588 clock class. But, various quality levels map into the same class. For example, QL_UNK and QL_STU both map to IEEE 1588 clock class 82.

FIG. 2 illustrates a clock class to quality level mapping table. The first column shows a range of eight clock class values. The following eight columns then show the quality level associated with the specific clock class among the range of eight clock class values. Note that the mappings for the tables in FIG. 1 and FIG. 2 may not be symmetric, i.e., in the first table A maps to B and in the second table B maps to A.

FIG. 3 illustrates a network and network manager that produces and uses the mapping tables. A network 300 may include a network manager 310, a user workstation 315, and a plurality of network elements 320a, 320b, 320c, and 320d. The user workstation 315 may be operated by a user to create mapping tables. The user may also specify situations and/or conditions where certain mapping tables may be used. The actual operation to produce the mapping tables may be carried out either on the user workstation 315 or the network manager 310. The network manager 310 may then provide mapping tables to the various network elements 320a-d. The network elements 320a-d may have default mapping tables. The default tables may be specified by the manufacturer or may be implemented by the user. Further, each network element 320a-d may have mapping tables specifically specified for use in interacting with each adjacent network element.

Figure 4:
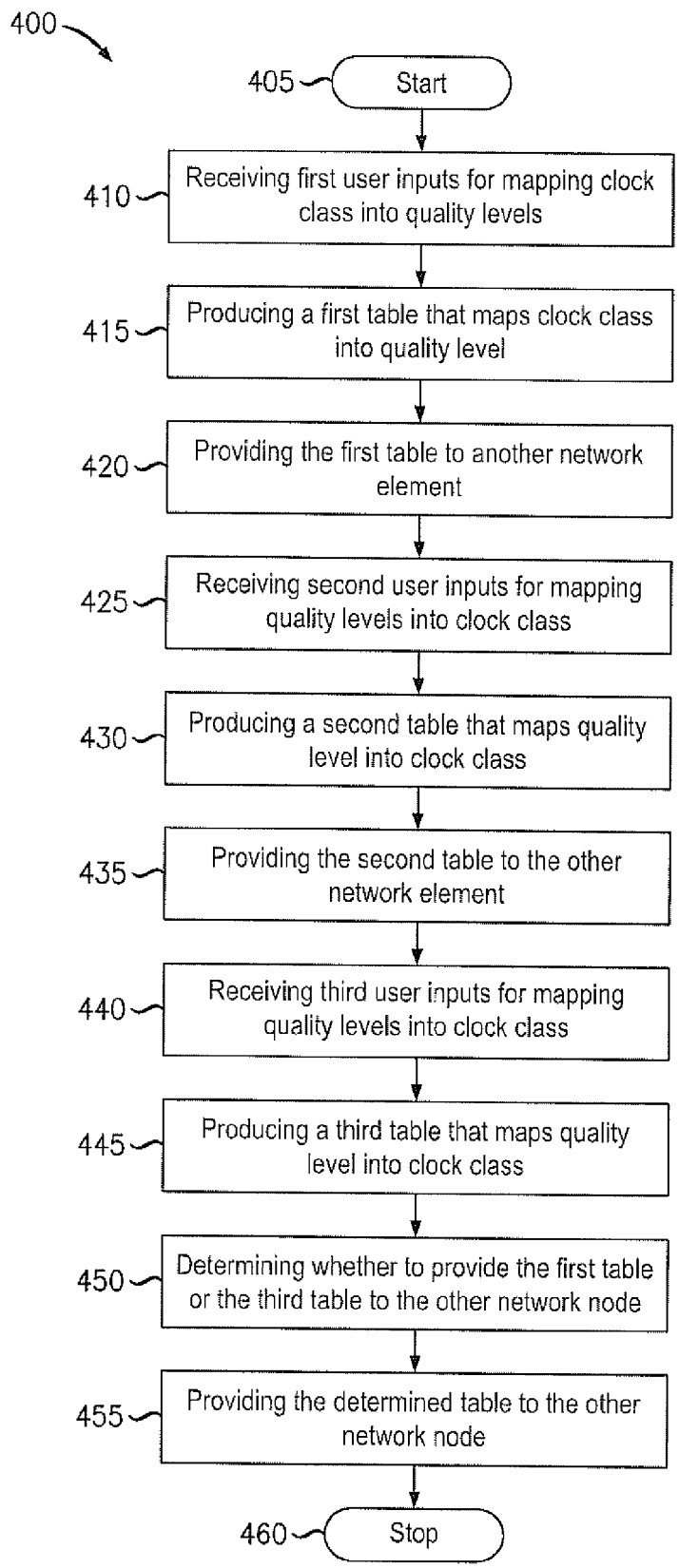
FIG. 4 illustrates a flow diagram illustrating a method of producing and distributing mapping tables.

FIG. 4 illustrates a flow diagram illustrating a method of producing and distributing mapping tables. The method 400 may be carried out by a network manager. Further, the network manager may be connected to a user workstation where the user work station receives inputs from a user regarding the mapping tables. The method may begin at step 405, and then may receive first user inputs for mapping clock class into quality levels 410. The method 400 then may produce a first table that maps clock class into quality level 415. The method 400 may provide the first table to another network element 420. Next, the method 400 may receive second user inputs for mapping quality levels into clock class 425. Then, the method 400 may produce a second table that maps quality level into clock class 430, and the method 400 may provide the second table to the other network element 435. In some situations the method 400 may end here, but the method 400 may also continue and receive third user inputs for mapping quality levels into clock class 440. The method 400 then may produce a third table that maps quality level into clock class 445. The method may then determine whether to provide the first table or the third table to the other network node 450. Finally, the method 400 may provide the determined table to the other network node 455. The method then ends at 460.

Alternatively, step 440 may receive third inputs for mapping clock class into quality level. Accordingly, step 450 may then determine whether to provide the second table or the third table to the other network node. These alternate steps may also be performed in addition to the steps of the method 400.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a first network element, the method comprising:

receiving first user inputs for mapping an IEEE 1588 clock class into ITU-T G.781 quality levels;
producing a first table that maps the IEEE 1588 clock class to the ITU-T G.781 quality level;
providing the first table to a second network element;
receiving second user inputs for mapping the ITU-T G.781 quality level into the IEEE 1588 clock class;
producing a second table that maps the ITU-T G.781 quality level to the IEEE 1588 clock class, wherein each ITU-T G.781 quality level maps into a single IEEE 1588 clock class; and
providing the second table to the second network element.

2. The method of claim 1, wherein the first table and second table asymmetrically map the ITU-T G.781 quality level and the IEEE 1588 clock class.

3. The method of claim 1, wherein the first and second user inputs are based upon an industry standard specification.

4. The method of claim 1, further comprising:
receiving third user inputs for mapping the IEEE 1588 clock class into the ITU-T G.781 quality levels;
producing a third table that maps the IEEE 1588 clock class to the ITU-T G.781 quality level;
determining whether to provide the first table or the third table to the second network element;
providing the determined table to the second network element.

5. The method of claim 4, further comprising:
receiving fourth user inputs for mapping the ITU-T G.781 quality level into the IEEE 1588 clock class;
producing a fourth table that maps the ITU-T G.781 quality level to the IEEE 1588 clock class; and
determining whether to provide the second table or the fourth table to the second network element;
providing the determined second table or fourth table to the second network element.

6. The method of claim 4, wherein determining whether to provide the first table or the third table to the second network element is based upon a characteristic of the second network element.

7. The method of claim 1, further comprising:
receiving fourth user inputs for mapping the ITU-T G.781 quality level into the IEEE 1588 clock class;
producing a fourth table that maps the ITU-T G.781 quality level to the IEEE 1588 clock class; and
determining whether to provide the second table or the fourth table to the second network element;
providing the determined table to the second network element.

8. The method of claim 1, wherein a plurality of the IEEE 1588 clock classes may map into the same ITU-T G.781 quality level.

9. The method of claim 1, wherein a plurality of ITU-T G.781 quality levels may map into the same IEEE 1588 clock class.

10. The method of claim 1, wherein the first network element is a network manager.

11. The method of claim 1, wherein providing the first table to the second network element overwrites a default mapping table in the second network element.

12. The method of claim 1, wherein the first and second mapping tables provided to the second network element are for use with a specific third network element adjacent to the second network element.

13. A non-transitory machine-readable storage medium encoded with instructions for execution by first network element, the medium comprising:
instructions for receiving first user inputs for mapping an IEEE 1588 clock class into ITU-T G.781 quality levels;
instructions for producing a first table that maps the IEEE 1588 clock class to the ITU-T G.781 quality level;
instructions for providing the first table to a second network element;
instructions for receiving second user inputs for mapping the ITU-T G.781 quality level into the IEEE 1588 clock class, wherein each ITU-T G.781 quality level maps into a single IEEE 1588 clock class;
instructions for producing a second table that maps the ITU-T G.781 quality level to the IEEE 1588 clock class; and
instructions for providing the second table to the second network element.

14. The non-transitory machine-readable storage medium of claim 13, wherein the first table and second table asymmetrically map the ITU-T G.781 quality level and the IEEE 1588 clock class.

15. The non-transitory machine-readable storage medium of claim 13, wherein the first and second user inputs are based upon an industry standard specification.

16. The non-transitory machine-readable storage medium of claim 13, further comprising:
instructions for receiving third user inputs for mapping the IEEE 1588 clock class into the ITU-T G.781 quality levels;
instructions for producing a third table that maps the IEEE 1588 clock class to the ITU-T G.781 quality level;
instructions for determining whether to provide the first table or the third table to the second network element;
instructions for providing the determined table to the second network element.

17. The non-transitory machine-readable storage medium of claim 16, further comprising:
instructions for receiving fourth user inputs for mapping the ITU-T G.781 quality level into the IEEE 1588 clock class;
instructions for producing a fourth table that maps the ITU-T G.781 quality level to the IEEE 1588 clock class; and
instructions for determining whether to provide the second table or the fourth table to the second network element;
instructions for providing the determined second table or fourth table to the second network element.

18. The non-transitory machine-readable storage medium of claim 13, wherein determining whether to provide the first table or the third table to the second network element is based upon a characteristic of the second network element.

19. The non-transitory machine-readable storage medium of claim 13, wherein providing the first table to the second network element overwrites a default mapping table in the second network element.

20. The non-transitory machine-readable storage medium of claim 13, wherein the first and second mapping tables provided to the second network element are for use with a specific third network element adjacent to the second network element.

* * * * *